Patented Aug. 29, 1950

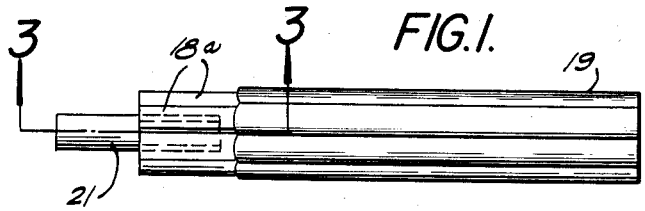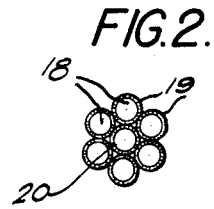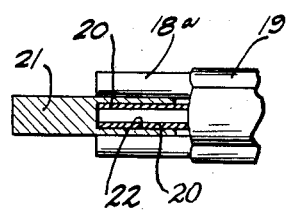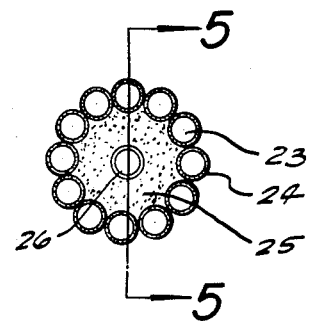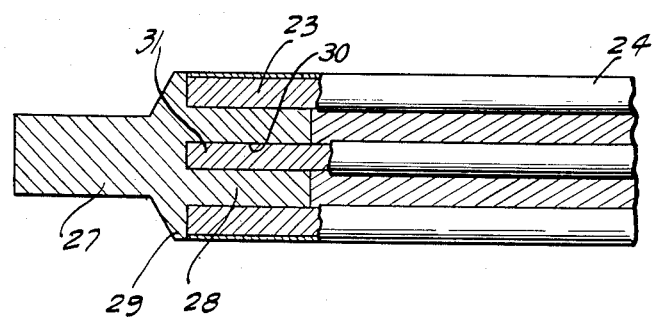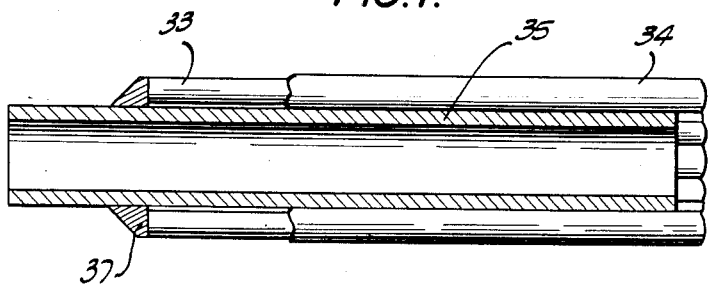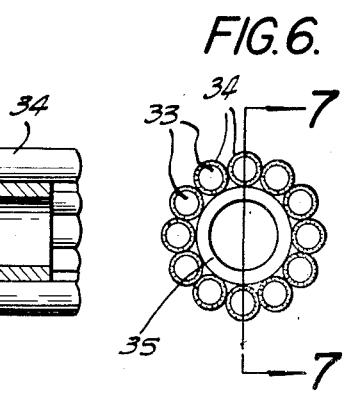

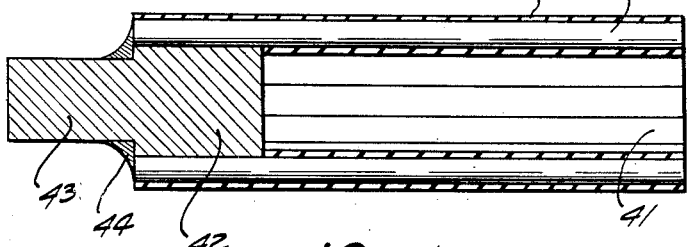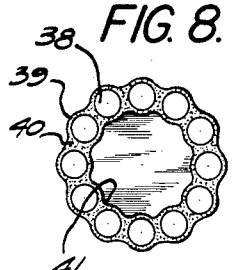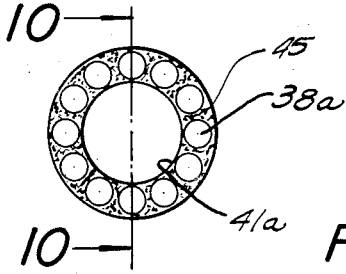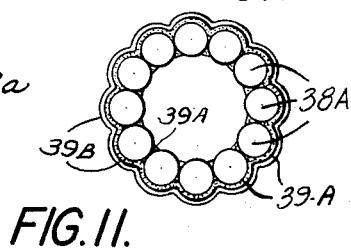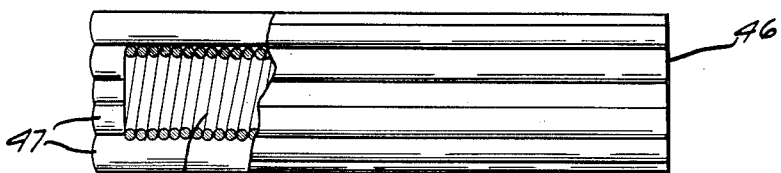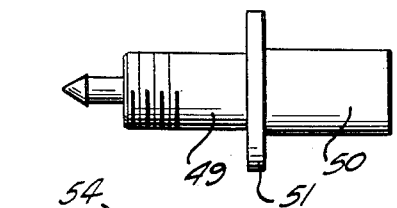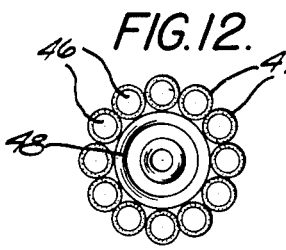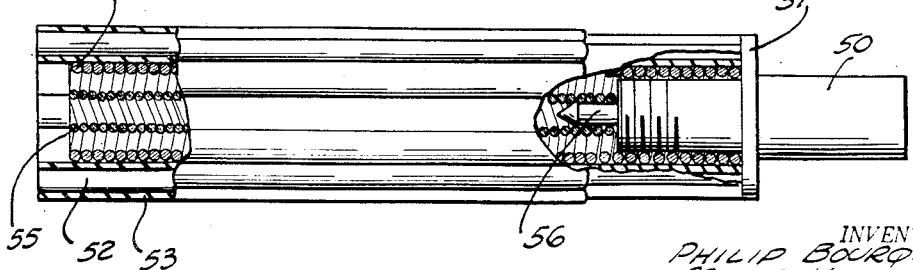

2,520,112

UNITED STATES PATENT OFFICE 2,520,112

ARC WELDING ELECTRODE

Philip Bourque and Matt Kiilunen, Detroit, Mich.

Application April 24, 1948, Serial No. 23,028

8 Claims. (Cl. 219—8)

Our invention relates to a new and useful improvement in an electrode used for arc welding.

It is an object of the present invention to provide an electrode comprising a plurality of rods or electrodes arranged in close formation and connected to a terminal body at one end and so arranged as to provide a hollow center.

Another object of the invention is the provision of an electrode having a plurality of electrodes or rods arranged in circular formation about a central core to provide a hollow body.

Another object of the invention is the provision of an electrode of this class comprising a plurality of rods or electrodes arranged in circular formation nested about a central core which may be dissipated when the welding operation is taking place.

Another object of the invention is the provision of an electrode whereby a high amperage may be used in the welding operation and a maximum amount of metal caused to flow in a single operation.

Another object of the invention is the provision of an electrode so arranged and constructed that while obtaining a maximum flow of metal the metal itself will be stabilized and prevented from flowing over an extensive area.

Another object of the invention is the provision of an electrode having a structure whereby a plurality of arcs will be present and the arcing from one electrode or rod to another will be avoided.

Other objects will appear hereinafter.

It is recognized that various modifications and changes may be made in the detail of structure illustrated without departing from the invention and it is intended that such shall be embraced within the scope of the claims which form a part hereof.

Forming a part of this specification are drawings in which:

Fig. 1 is a side elevational view of an electrode embodying the invention,

Fig. 2 is an end elevational view of an electrode shown in Fig. 1,

Fig. 3 is a fragmentary view taken on line 3—3 of Fig. 1, showing parts in section and parts in side elevation, Fig. 4 is an end elevational view of another form of the invention, Fig. 5 is a fragmentary view taken on line 5—5 of Fig. 4, Fig. 6 is an end elevational view of another form of the invention, Fig. 7 is a sectional view taken on line 7—7 of Fig. 6, Fig. 8 is an end elevational view of one form of the invention, Fig. 9 is an end elevational view of one form of the invention, similar to Fig. 8, with a slight variation, Fig. 10 is a sectional view taken on line 10—10 of Fig. 9, Fig. 11 is a side elevational view of another form of the invention with a part broken away and a part shown in section, Fig. 12 is an end elevational view of the form shown in Fig. 11, Fig. 13 is a side elevational view of a gripping terminal body, Fig. 14 is a side elevational view of another form of the invention with parts broken away and parts shown in section, Fig. 15 is a view similar to Fig. 8, with a slight modification.

In the form shown in Fig. 1, we provide a plurality of electrodes or metallic rods 18 each of which is covered with a covering 19 of suitable insulating material commonly known as flux. These rods 18 are nested about a central tube 20 which is also covered with a covering of flux. A terminal 21 which is formed from metal is provided with a hollow end 22 in which one end of the tube 20 engages. The electrode holder would grip the terminal 21 in the welding operation. In the welding operation the current would then pass through the central tube 20 and also through the rods 18 as the rods 18 are bared at their ends 18—a and free from flux and in close engagement with the metallic terminal 21. At the operating end of the electrode there is thus provided a plurality of rods which are insulated from each other and in spaced relation and these rods are positioned about the central core 20 which is hollow. Experience has shown that in operation a high amperage may be used in such an electrode and the flow of metal considerably increased over that which can be obtained when a single electrode is used. Experience has also shown that by having the core 20 hollow a more efficient welding operation can be effected. The sparking of the electrode rods at their arcing ends from one to the other is avoided and as the welding operation continues the tube 20 will also be caused to melt and flow. However, this tube 20 will flow faster than the rods 18 so that the end of the tube 20 is always positioned inwardly from the operating ends of the rods 18 thus forming within the space separating the rods and inwardly from their ends a sort of well in which the member 20 is being melted so that there is virtually within the space at the operating ends of the rods 18 a fire box or furnace. This has the effect of heating the ends of the electrodes and facilitates their flowing during the welding operation. Experience has also shown that this results in a stabilizing of the arc, that is the flow of the metal is concentrated over the area defined by the ends of the rods 18 and sputtering and spattering is reduced to a minimum thus retaining the "flowed" metal in the desired area.

In Fig. 4, we have shown a slight modification in which the rods 23 are provided with a covering 24 of flux excepting at one end. These rods 23 are positioned around a central tubular core 26 which is provided with a solid end 31 engaging in the socket 30 formed in the extension 28 of the terminal 27, this terminal 27 having a flange 29 which may be welded or otherwise secured to the ends of the rod 23. In the space between the central tubular member 26 and the rod 23 we have inserted a powdered metal 25 such as powdered aluminum. Any suitable alloy may be used but it is preferred to use aluminum in that the aluminum will prevent oxidation. The forming of the chamber at the end of the electrode in which the central core 26 will be melted and in which the end of the powder aluminum 25 will also be melted is present as for the form shown in Fig. 1 with the same results so far as stabilizing the arc and facilitating and controlling the flow of the metal.

In Fig. 7, we have shown an electrode embodying the metallic tube 35 positioned around which are the rods 33 each of which is covered with a covering 34 of flux. These rods 33 are welded by the weld 37 to the extending end of the tube 35 which projects outwardly beyond one end of the rods 33. The extending end of the tube 35 forms the terminal which is to be gripped by the electrode holder. It will be noted that the rod 35 terminates inwardly from the ends of the rods 33 a slight distance and this is the distance that is usually maintained in an electrode holder of this size. When in operation tube 35 will be burning off at its end inwardly from the ends of the electrode.

In Fig. 8, we have shown an electrode having a plurality of rods 38 each provided with a covering 39 and these coverings of flux 39 amalgamating with each other as at 40 so as to provide circular body having the cored center 41. The terminal 43 is provided with the extension 42 which fits within one end of the bared ends of the rod and the ends of the rods 38 are welded to the terminal 43 by the weld 44. In Fig. 9, the structure is the same as shown in Fig. 8, excepting that instead of having flux around the rods in a layer a ring 45 of flux is formed around the rods 38—a to provide the central core 41—A.

In Fig. 11, we have shown the rods 46 provided with a covering 47 of flux and positioned about a coil spring 48. The terminal 50 which is gripped by the electrode holder is provided with a flange 51 and an extension 49. This extension 49 may be threaded into one end of the spring 48 to serve as a retainer. It will be noted that the spring 48 also terminates inwardly from one end of the rods which would be the operating end and thus the inwardly positioned furnace or fire box is thus afforded with the advantages enumerated.

In Fig. 14, we have shown a slight modification in which the rods 52, each provided with a covering 53 of flux, are positioned about an outer spring 54 and in which is positioned an inner spring 55. The terminal 50 is provided with a flange 51 where the extension is threaded into one end of the outer spring 54 and the central boss 56 is threaded into one end of the central spring 55. Again it will be noted that these springs terminate inwardly from one end of the rod for the advantages already mentioned.

In Fig. 15, we have shown a slight modification in which the rods 38—A are covered with a coating 39—A as shown in Fig. 8. Embracing this coating 39—A is a sheathing or skin 39B of very thin metal and preferable aluminum. Experience has shown that with a sheathing or skin 39B of aluminum the rods are more firmly bound together and at the same time a deoxidizing agent is present during the welding operation, the aluminum sheathing or skin 39B being burned or fused at the same time the rod is consumed.

With an electrode constructed in this manner the various advantages enumerated are obtained. Moreover in addition to the advantages set out, the deep penetration of the arc into the material operated upon is prevented and there is a more rapid and uniform spreading of the metal, with the result that thinner metals may be welded with a higher amperage than is customary where a conventional type of electrode or rod is used.

What we claim as new is:

1. An electric arc welding electrode comprising an elongated hollow body; a plurality of welding electrodes positioned about said body in longitudinal alinement therewith; and means for electrically connecting one end of said electrodes to said body.

2. An electric arc welding electrode comprising an elongated hollow body; a plurality of welding electrodes positioned about said body in longitudinal alinement therewith; and means for electrically connecting one end of said welding electrodes to said body, said electrodes extending beyond one end of said body and said body at its opposite end extending beyond the end of said electrodes.

3. An electric arc welding electrode comprising an elongated hollow body; a plurality of welding electrodes positioned about said body in longitudinal alinement therewith; means for electrically connecting one end of said welding electrodes to said body, said electrodes extending beyond one end of said body and said body at its opposite end extending beyond the end of said electrodes; and insulating means for insulating said electrodes from each other and from said body throughout their major portion of the length.

4. An electric arc welding electrode comprising a tubular metallic body; a plurality of welding electrodes positioned around the periphery of said body in spaced relation to each other; a metallic extension on said body extending beyond one end of said electrodes to provide a gripping portion for an electrode holder; means for electrically connecting one end of said welding electrodes to said body, said electrodes projecting at their opposite ends beyond the adjacent end of said body.

5. An electric arc welding electrode comprising a tubular metallic body; a plurality of welding electrodes positioned in spaced relation around the periphery of said body and extending longitudinally thereof; a metallic gripping member on said body and electrically connected to one end of said electrodes and projecting outwardly from one end of said electrodes; and means for insulating said electrodes from each other.

6. An electric arc welding electrode comprising a tubular metallic body; a plurality of welding electrodes positioned in spaced relation around the periphery of said body and extending longitudinally thereof; a metallic gripping member on said body and electrically connected to one end of said electrodes and projecting outwardly from said end of said electrodes, said electrodes projecting at their other ends beyond the adjacent end of said tubular body.

7. An electric arc welding electrode comprising a tubular metallic body; a plurality of welding electrodes positioned in spaced relation around the periphery of said body and extending longitudinally thereof; a metallic gripping member on said body and electrically connected to one end of said electrodes and projecting outwardly from said end of said electrodes, said electrodes projecting at their other ends beyond the adjacent end of said tubular body, and an additional tubular member extending within the first named tubular member and electrically connected at one of its ends to said gripping member.

8. An electric arc welding electrode comprising a tubular metallic body; a plurality of welding electrodes positioned in spaced relation around the periphery of said body and extending longitudinally thereof; a metallic gripping member on said body and electrically connected to one end of said electrodes and projecting outwardly from said end of said electrodes; and means for insulating said electrodes from each other, said electrodes projecting at their other end beyond the adjacent end of said tubular body, and a sheathe of metal surrounding said electrodes for binding the same together.

PHILIP BOURQUE.
MATT KIILUNEN.

REFERENCES CITED

The following references are of record in the file of this patent:

UNITED STATES PATENTS

| Number | Name | Date |
|---|---|---|
| 1,814,878 | Weed | July 14, 1931 |
| 1,857,521 | Stresau et al. | May 10, 1932 |